Patented May 18, 1943

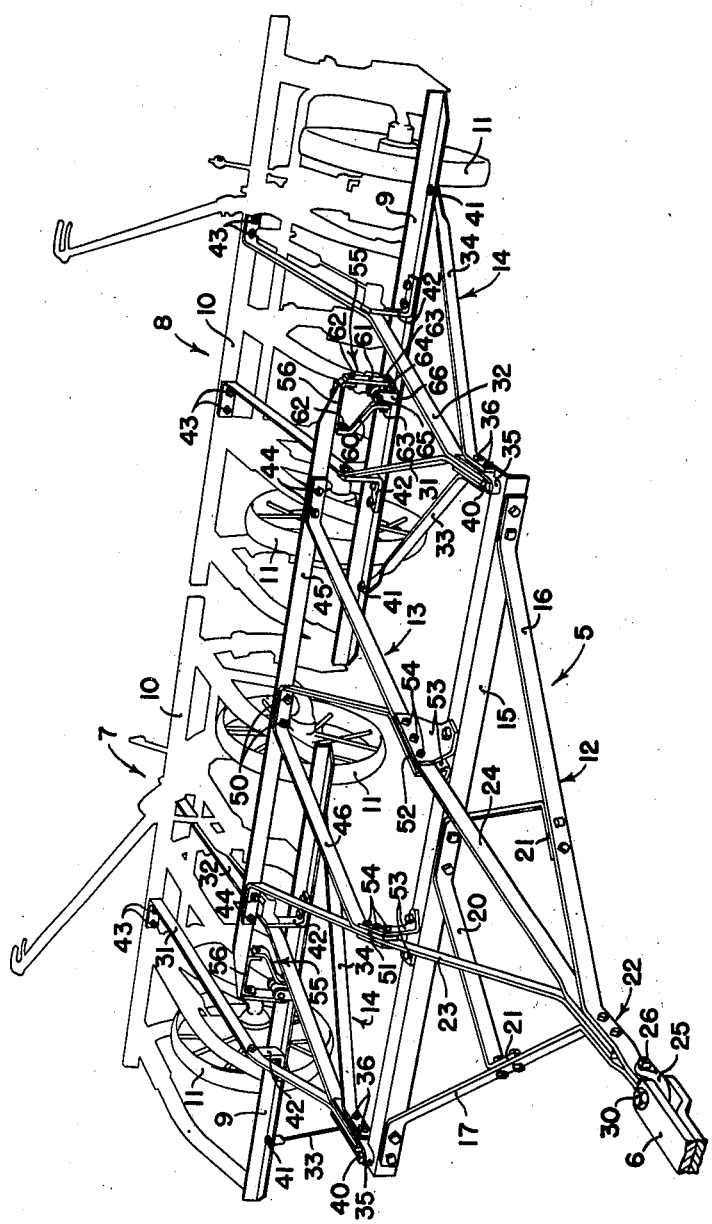

2,319,751

UNITED STATES PATENT OFFICE 2,319,751

MULTIPLE HITCH DEVICE

Walter H. Silver, Moline, Ill., assignor to Deere & Company, Moline, Ill., a corporation of Illinois Application August 12, 1939, Serial No. 289,713

10 Claims. (Cl. 97—233)

The present invention relates generally to hitch devices and more particularly to a multiple hitch device for connecting a plurality of independently movable agricultural implements, such as gangs of lister plows or the like, behind a tractor.

The principal object of my invention is to provide a new and improved multiple tractor hitch adapted to hold the several implements in constant laterally spaced relation and preventing fore and aft tilting relative to each other, while allowing the implements to rise and fall relative to one another and to tilt laterally about their respective longitudinal axes.

Other objects and advantages will become apparent after consideration of the following description of the preferred embodiment of my invention, reference being had to the appended drawing, in which The single figure is a perspective view of a multiple hitch embodying the principles of my invention, applied to a pair of gangs of tilling tools.

Referring now to the drawing, the hitch frame is indicated in its entirety by the reference numeral 5 and is adapted to be connected with and supported on a tractor drawbar 6. Coupled to the hitch frame 5 substantially in transverse alignment with one another are two tilling implements or gangs 7 and 8, each comprising a tool carrying frame made up of a plurality of longitudinally extending beams interconnected by front and rear transverse angle iron members 9, 10, each frame being supported on a pair of laterally spaced wheels 11, which are provided for transport purposes.

The hitch frame 5 comprises a main draft frame 12, a stabilizing frame 13 disposed generally above and extending rearwardly of the main draft frame 12, and supplemental draft frames 14 connecting each of the gangs 7, 8 with the main draft frame 12. The main draft frame 12 is generally triangular in shape and comprises a transverse draft beam 15, preferably in the form of an angle arranged with its horizontal flange at the top with forwardly converging draft members 16, 17 bolted to the outer ends thereof. A substantially V-shaped bracing member 20 is bolted to the midportion of the beam 15 and extends forwardly therefrom in diverging relation, its ends being joined at 21 with the members 16 and 17 to give rigidity to the frame. The front ends of the members 16, 17 are bent to extend forwardly in generally parallel relation and are spaced apart for a short distance, as at 22, to receive between them the front ends of the stabilizing frame members 23 and 24. A hitch clevis 25 is pivotally connected with the front end of the draft members 16, 17 by a transverse pivot bolt 26, and is adapted to be received in the forked end of the tractor drawbar 6 and to be connected therewith by a coupling bolt 30.

The supplemental draft frames 14 are disposed at opposite ends of the beam 15 and each comprises a pair of stabilizing members 31, 32 and a pair of draft members 33, 34, all of said members converging forwardly to a U-shaped strap 35 to which they are secured by bolts 36. The strap 35 loosely embraces a vertical connecting bolt 40, which extends through a suitable hole in the top flange of the beam 15, and therefore provides a relatively flexible hitch connection between the auxiliary draft frame 14 and main draft frame 12, which permits each auxiliary frame and the associated implement or gang, 7 or 8, to tilt laterally relative thereto about a generally longitudinally extending axis that passes through the members 35 and 40. The draft members 33, 34 diverge rearwardly at a wide angle from the U-shaped strap 35 and are fixed to the outer end portions of the frame member 9 by bolts 41. The stabilizing members 31, 32 diverge rearwardly from the strap 35 at a considerably smaller angle and pass rearwardly above the associated frame member 9 in spaced parallel relation, their rear ends being bent outwardly at right angles and bolted at 43 to the rear frame member 10. The members 31, 32 are supported on the member 9 by means of a pair of laterally spaced angle brackets 42 which are mounted on the member 9 as shown.

The stabilizing frame 13 has the dual function of holding the two gangs 7, 8 in constant laterally spaced relation, and providing longitudinal rigidity so that the hitch frame 5 is prevented from sagging or buckling at the flexible hitch connections 35, 40 between the main draft frame 12 and supplemental draft frames 14. The frame 13 consists of the two members 23, 24, which diverge rearwardly from their front end connection at 22 with the main draft frame members 16, 17, and are connected at their rear ends by bolts 44 with a transverse stabilizing beam 45. The transverse beam 45 is disposed above the stabilizing members 31, 32 and in the vertical plane of the front frame members 9, and extends from the midpoint of gang 7 to the midpoint of gang 8. A substantially V-shaped bracing member 46 is bolted at 50 to the midportion of the transverse stabilizing beam 45 and extends divergingly forward therefrom, with its ends 51 and 52 connected to the members 23, 24. The stabilizing frame 13 is connected with the transverse beam 15 of the main draft frame 12 by two pairs of bracket members 53, which are bolted to the top flange of the beam and extend upwardly therefrom on opposite sides of the frame members 23, 24 and adjacent ends 51, 52, of the bracing member 46. Bolts 54 are passed through aligned holes in the bracket members and associated frame members to secure them together.

The outer ends of the transverse beam 45 are connected with their respective gangs 7, 8 by jointed link means 55 which are flexible to allow the gangs to tilt laterally relative to the beam 45 while preventing the gangs from swinging laterally toward or away from each other. Experience has indicated that there is also an appreciable amount of fore and aft movement of the gangs 7, 8 relative to the transverse beam 45 which is probably due to flexing of the several members comprising the draft and stabilizing frames as the implement travels over rough and uneven ground. Unless suitable provision is made for this fore and aft movement, there is a tendency for the connecting joint between the stabilizing frame 13 and the implement gangs to wear excessively, and the possibility of certain frame members bending beyond their elastic limits. Accordingly, the link means 55 is designed to allow the gangs to move longitudinally relative to the stabilizing frame beam 45 without transmitting stresses to the same. Each of these link means 55 comprises an inverted U-shaped bracket member 56 fixed to the underside of the beam 45 with the arms thereof extending downwardly. A pair of laterally spaced link bars 60 and 61 are connected by coaxial transverse pivot pins 62 with the arms of the U-shaped bracket member 56 for fore and aft swinging movement. Link bar 60 is bent laterally toward link bar 61 so that the lower ends thereof are in close proximity with each other, and both bars are connected at their lower ends by a transverse pivot pin 63 with a universal joint spider 64. The spider 64 is pivotally connected by a longitudinally extending pivot pin 65 with the upwardly extending arms of a U-shaped bracket 66 fixed to the center of the horizontal flange of the front frame bar 9 substantially in fore and aft alignment with the hitch connection 35, 40. Thus, the link bars 60, 61 and universal joint 63—66 allow the gangs 7 and 8 to tilt laterally relative to the draft and stabilizing frames 12, 13, and also to move longitudinally relative to the beam 45, but prevent the gangs from swinging toward or away from each other.

From the foregoing, it will be seen that my invention provides a rigidly braced multiple hitch device affording a high degree of flexibility to the implement gangs whereby the gangs are enabled to follow the contour of the ground freely while maintaining a constant laterally spaced relation to one another at all times.

What I claim as my invention is:

1. For use in connecting a plurality of laterally spaced implements to a tractor, a multiple hitch device comprising a main draft frame, a hitch connection for attaching said main draft frame with the tractor, a plurality of supplemental draft frames adapted to be connected one to each of the implements, a generally laterally extending stabilizing member rigidly connected with said main draft frame, and means connecting said supplemental draft frames with said main draft frame and with the laterally outer end portions of said stabilizing member so as to provide for pivotal movement of each implement about a longitudinal axis but preventing lateral movement of said implements, thereby holding the implements in constant laterally spaced relation to one another.

2. For use in connecting a plurality of laterally spaced implements to a tractor, a multiple hitch device including a main draft frame comprising a transverse draft member and at least one forwardly extending member fixed thereto, hitch means for connecting the front end of said forwardly extending member with the tractor, draft frame means adapted to be rigidly secured to each of the implements, means loosely connecting said draft frame means with said transverse draft member in laterally spaced relation, said connecting means providing for lateral tilting of the implements relative to said transverse draft member, a stabilizing frame rigidly connected with said main draft frame and extending rearwardly thereof, and means providing for fore and aft and lateral tilting movement of each implement for connecting the rearwardly extending portion of said stabilizing frame with the implements for holding the latter in substantially constant laterally spaced relation to one another, 3. For use in connecting a plurality of laterally spaced implements to a tractor, each of said implements having a frame, a multiple hitch device including a main draft frame comprising a transverse draft beam and forwardly converging draft members fixed thereto, hitch means for connecting the front ends of said forwardly converging members with the tractor, a plurality of supplemental draft frames rigidly connected, respectively, to said implement frames, means for connecting said supplemental frames to said transverse draft beam in laterally spaced relation and providing for lateral tilting of the implements relative to the transverse draft beam, a stabilizing frame rigidly connected with said main draft frame and including a transverse beam disposed to the rear of and spaced vertically from said transverse draft beam, and downwardly extending means connecting said transverse beam with the front portion of each of the implement frames for holding the implements in substantially constant laterally spaced relation to one another, said connecting means including parts movable relative to one another about generally longitudinally extending axes to accommodate tilting movement of said implements about said axes relative to the main draft frame and stabilizing frame.

4. For use in connecting a pair of implements to a tractor, a multiple hitch device comprising a main draft frame adapted to be swingably connected with the tractor, a supplemental draft means connected to each implement, hitch means connecting said supplemental draft means to said main draft frame in laterally spaced relation and providing for lateral tilting of the implements with respect to the draft frame about longitudinal axes, a stabilizing frame rigidly connected with said main draft frame and extending rearwardly thereof, and means disposed substantially in said longitudinal axes rearwardly of said main draft frame for pivotally connecting the implements with said rearwardly extending portion of the stabilizing frame for accommodating said lateral tilting movement of the implements relative to said stabilizing frame and for preventing said implements from swinging laterally.

5. A multiple hitch device as defined in claim 4, further characterized by said last mentioned means including link means disposed substantially in fore and aft alignment with said hitch means, means hingedly connecting one end of said link means with said stabilizing frame, and means connecting the other end of said link means with the associated implement for movement relative thereto about a plurality of axes, thereby providing for lateral tilting and fore and aft movement of the implements relative to the stabilizing frame while maintaining the implements in laterally spaced relation to each other.

6. For use in connecting a pair of implement frames to a tractor in laterally spaced relation, a multiple hitch device comprising, in combination, a main draft frame adapted to be connected with the tractor for relative swinging movement, a pair of hitch means connecting said implement frames with said main draft frame in laterally spaced relation to one another and providing for lateral tilting of the implements with respect to the draft frame, a stabilizing frame rigidly connected with said main draft frame in overlapping relation, said stabilizing frame having a transverse beam disposed to the rear of the main draft frame and above said implement frames, link means disposed substantially in longitudinal alignment with each of said hitch means and pivotally connected with said transverse beam for fore and aft swinging, and a universal joint connection between each of said link means and its respective implement frame, said universal joint providing for fore and aft swinging and lateral tilting of the implements relative to said link means.

7. A multiple hitch device for connecting a plurality of implements to a tractor, comprising in combination, a transversely extending draft beam, a transversely extending stabilizing beam spaced rearwardly from said draft beam and vertically from said implement, bracing members rigidly connecting said beams together, forwardly converging draft members for connecting said draft beam to the tractor, means for connecting each of said implements to said draft beam providing for lateral tilting movement of each implement about a fore and aft extending axis but preventing movement of said implements in a generally fore and aft direction relative to said hitch device, and vertically extending link means pivotally connected to said stabilizing beam and to each of said implements providing for said lateral tilting movement thereof about said axes but preventing lateral shifting movement of said implement relative to said stabilizing beam.

8. A multiple hitch device for connecting a plurality of implement frames to a tractor, for maintaining said implements in a predetermined laterally spaced relation and preventing fore and aft tilting of the latter relative to one another, but providing for independent lateral tilting thereof about fore and aft extending axes, said hitch device comprising, in combination, a rigid hitch frame having means at the forward end thereof for swingably connecting the latter to a tractor, draft means for swingably connecting the forward ends of said implement frames to said rigid frame for tilting movement relative to the latter and to each other about laterally spaced longitudinally extending axes, and stabilizing connections extending between said rigid frame and said implement frames at points spaced rearwardly of said implement draft connections, respectively, each of said stabilizing connections including generally vertically disposed link means connected at its ends, respectively, with the associated implement frame and said rigid hitch frame so as to be swingable about transversely disposed axes, pivot means disposed between one end of said link means and the frame to which that end of the link means is connected, the axis of said pivot means being substantially coaxial with the longitudinally extending axis about which the associated implement frame is swingable, and pivot means disposed between the other end of said link means and the frame to which said other end is connected, the axis of said last mentioned pivot means extending generally transversely, whereby each of said stabilizing connections accommodates the movement of the associated implement frame about its longitudinal axis and prevents lateral movement thereof relative to the hitch frame and also prevents draft force from being applied through the stabilizing connection to the associated implement frame.

9. An agricultural machine comprising a plurality of implements, each having a frame, a rigid draft frame, pivotal supporting means mounting the rear portion of said draft frame, and draft connections between said implements and said draft frame spaced forwardly of and generally in longitudinal alignment with said pivotal supporting means, said pivotal supporting means being laterally rigid and including means defining transverse and longitudinal pivots so as to accommodate pivotal movement of each implement relative to the draft frame about a longitudinal axis but preventing the transmission of draft forces between the draft frame and the implements through said pivotal supporting means.

10. An agricultural machine comprising a plurality of implements, a draft frame connected with the forward portions of the implements to transmit draft pull thereto, and means carried by the draft frame and connected with the rear portions of the implements to hold the latter against lateral movement relative to the draft frame and relative to each other, said last mentioned means including longitudinally movable parts serving to prevent the transmission of draft pull forces by the means that prevents relative movement between the implements.

WALTER H. SILVER.